Patented Aug. 15, 1950

2,519,231

UNITED STATES PATENT OFFICE 2,519,231

HEAT-RESISTANT TIRE CURING BAG

Richard A. Crawford and Gail C. Rogers, Akron, Ohio, assignors to The B. F. Goodrich Company, New York, N. Y., a corporation of New York No Drawing. Application March 1, 1945,
Serial No. 580,476

1 Claim. (Cl. 18—45)

This invention relates to improved synthetic rubber materials which are outstandingly heat resistant as well as possessing other desirable properties, and pertains more specifically to synthetic rubber compositions and articles prepared by covulcanizing two different types of unvulcanizable synthetic rubbers.

The two different types of vulcanizable synthetic rubbers which are covulcanized according to this invention are:

(1) Synthetic rubber of the type commonly known and hereinafter sometimes referred to as isoolefin-diolefin copolymer synthetic rubber, and consisting of a solid, plastic, hydrocarbon copolymer of a major proportion of an isoolefin having from 4 to 5 carbon atoms with a minor proportion of an open-chain or linear conjugated diolefin having from 4 to 6 carbon atoms. Such hydrocarbon copolymer synthetic rubbers are characterized by possessing low unsaturation below an iodine number of 50, a molecular weight above 15,000 and the ability to be vulcanized to yield an elastic product; and are prepared from an olefinic mixture containing a major amount, preferably from 70 or 80 to 99½ parts by weight, of an isomonoolefin such as isobutylene or ethyl methyl ethylene, together with a minor amount, preferably from ½ to 20 or 30 parts by weight, of an open-chain conjugated diolefin such as butadiene-1,3, isoprene, piperylene, 2,3-dimethyl butadiene-1,3, 1,2-dimethyl butadiene-1,3 (or 3-methyl-pentadiene-1,3), 1,3-dimethyl butadiene-1,3, 1-ethyl butadiene-1,3 (or hexadiene-1,3), 1,4-dimethyl butadiene-1,3 (or hexadiene-2,4) or the like, by copolymerizing the mixture at low temperatures, between 0° C. and −160° C., in the presence of a Friedel-Crafts catalyst such as aluminum chloride preferably dissolved in an organic solvent such as ethyl chloride, as is disclosed more fully in U. S. Patents 2,356,128, 2,356,129 and 2,356,130 to Thomas and Sparks.

(2) Synthetic rubber of the type commonly known and hereinafter sometimes referred to as "neoprene," and consisting of a plastic polymer of a chloro butadiene-1,3. Such synthetic rubbers are characterized by possessing a high degree of unsaturation comparable to that of natural rubber (which has an iodine number of about 300 to 400), a chlorine content of about 20 to 40% or even more, a high molecular weight above 100,000, and the ability to be vulcanized to yield an elastic product; and are prepared by polymerizing, for example by heat, in solution or in emulsion, a chloro butadiene-1,3 such as 2-chlorobutadiene-1,3 (called chloroprene) or 2,3-dichloro-butadiene-1,3 either alone or in admixture with lesser amounts of copolymerizable monomers such as styrene, acrylonitrile, or butadiene-1,3. Typical examples of these synthetic rubbers are known to the trade as "Neoprene E," "Neoprene GN," "Neoprene KN," "Neoprene I," "Neoprene Z," "GR–M" and "GR–M–10."

Although each of the above types of synthetic rubber is well known to the art, and has been employed quite extensively in the production of useful vulcanized products, it has heretofore never been proposed to admix the two types of rubber prior to the vulcanization of either and then to covulcanize the mixture. Instead, the compounding of unvulcanized butyl rubber with any material possessing a higher degree of aliphatic unsaturation, including natural rubber and highly unsaturated synthetic rubbers such as diene polymers, has scrupulously been avoided because of the belief that the addition of any such unsaturated materials would prevent the vulcanization of the isoolefin-diolefin copolymer rubber.

In fact, it has heretofore been stated that isoolefin-diolefin copolymer rubber does not covulcanize with natural rubber and other synthetic rubbers (see Plastics Catalogue, 1944, p. 877); and because of that belief it has even been proposed, when it is desired to use vulcanized mixtures of such materials with other rubbery materials to prevulcanize the isoolefin-diolefin copolymer rubber before combining with the other rubbery material (see U. S. Patent 2,332,194 to Beekley and Sparks).

But despite the many teachings in the art to the effect that the covulcanization of isoolefin-diolefin copolymer rubber with other more unsaturated vulcanizable rubbery materials should not be attempted, we have nevertheless discovered that unvulcanized isoolefin-diolefin copolymer rubber may be admixed with unvulcanized neoprene synthetic rubber and that the resulting mixture may be covulcanized after the addition of suitable vulcanizing ingredients.

Moreover, we have found that the covulcanizates of isoolefin-diolefin copolymer and neoprene so prepared are extremely valuable, heat-resistant, strong and elastic, rubbery materials, which are capable of retaining their strength, elasticity and extensibility when exposed to elevated temperatures for prolonged periods of time, to a much greater extent than are either isoolefin-diolefin copolymer vulcanizates or neoprene vulcanizates. In addition the covulcanizates possess extreme resistance to acids and alkalies, to oxidation and aging, to ozone, to sunlight, to water, and to diffusion of gases, even at elevated temperatures, as well as other outstanding properties, as will be hereinafter described.

Because of the unusual ability of the covulcanizates of this invention to maintain their useful properties at elevated temperatures, without either softening or becoming brittle, they are particularly useful in the manufacture of such articles as curing bags for tires, inner tubes for use in heavy duty tires, steam hose, hot water bottles, heat-resisting gaskets, motor mounts, electrical insulation to be used in motors, and the like, and in numerous other applications where high strength, elasticity and extensibility at high temperatures are desired.

In the practice of the invention covulcanizates of isoolefin-diolefin copolymer and neoprene synthetic rubbers are prepared by admixing in any desired manner unvulcanized isoolefin-diolefin copolymer synthetic rubber with unvulcanized neoprene synthetic rubber and with vulcanizing ingredients, and also, if desired, with various other compounding ingredients such as reinforcing pigments, fillers, softening agents, antioxidants and the like, and then vulcanizing the resulting composition by heating at a temperature and for a time sufficient to convert the plastic unvulcanized composition to an elastic vulcanizate.

The initial admixing of the various ingredients may be effected on a roll mill or in an internal mixer such as a Banbury mixer or by a combination of the two methods, and follows conventional processing procedure. The two synthetic rubbers may first be blended before addition of the various compounding and vulcanizing ingredients, in which event it is found that the nerve of the isoolefin-diolefin copolymer rubber is considerably reduced by blending with neoprene, thereby making subsequent compounding of the mixture much less difficult than when isoolefin-diolefin copolymer is the only rubbery material used; or, alternatively, the isoolefin-diolefin copolymer and neoprene may separately be compounded and the two compounded compositions then blended before vulcanization. In either event a homogeneous mixture comprising the two unvulcanized materials is formed.

In preparing the mixture of unvulcanized isoolefin-diolefin copolymer rubber and unvulcanized neoprene, substantial proportions of each of the two materials are used, but the relative amounts of the two may be varied considerably. Mixtures containing 5 to 95 parts of isoolefin-diolefin copolymer and 5 to 95 parts of neoprene have all been found to yield excellent covulcanizates. For many purposes the relatively lower cost of isoolefin-diolefin copolymer makes it desirable to employ predominant amounts of isoolefin-diolefin copolymer, say 50 to 95 parts of isoolefin-diolefin copolymer together with 5 to 50 parts of neoprene; and such mixtures when covulcanized, possess particularly outstanding retention of elongation at elevated temperatures.

Higher hot tensile strengths, however, are secured with predominant amounts of neoprene; hence mixtures within the range of 50 to 95 parts of neoprene together with 5 to 50 parts of isoolefin-diolefin copolymer are preferred in other instances.

As vulcanizing ingredients to be used in compounding the mixtures, it has been found preferable to employ a combination of (a) from 0.1 to 3.0 parts of sulfur, (b) from 0.1 to 3.0 parts of a dithiocarbamyl compound such as a thiuram sulfide (typical examples of which are tetramethyl thiuram disulfide, tetraethyl thiuram disulfide, tetramethyl thiuram monosulfide, dipentamethylene thiuram tetrasulfide and other compounds of the formula

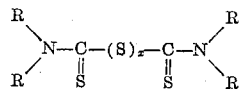

wherein each R is an organic radical preferably an alkyl group of less than 10 carbon atoms and $x$ is an integer from 1 to 4) or a dithiocarbamate (typical examples of which are zinc dibutyl dithiocarbamate, zinc dimethyl dithiocarbamate and selenium diethyl dithiocarbamate) and (c) from 5 to 15 parts of an oxide of zinc, magnesium or lead or a fat acid salt of such metals, all based on 100 parts of the mixture of rubbery materials, but considerably wider variations in the nature and amounts of vulcanizing ingredients is also possible. For example, quinoid type vulcanizing agents or vulcanization activators such as para quinone dioxime and the like may be employed in place of or in addition to sulfur; other vulcanization accelerators such as the mercaptothiazoles and mercaptothiazolines and their derivatives may be used to replace or to supplement the dithiocarbamyl compound; and other metallic compounds or other vulcanization activators may be used in place of or in addition to the oxides and fat acid salts mentioned, or such materials may be dispensed with entirely in some instances.

The nature and amount of other compounding ingredients will depend upon the particular use to be made of the covulcanizate, and may be varied widely. For "pure gum" or "high gum" vulcanizates, which are quite valuable for many purposes, little if any additional compounding ingredients need be employed but it will ordinarily be advantageous to compound the mixture of rubbery materials with 10 to 100 parts, based on 100 parts of the mixture, of fillers or reinforcing pigments such as the various carbon blacks, clays, finely-divided calcium carbonate or calcium silicate or other inorganic or organic materials commonly used as pigments in the rubber industry. Amounts of zinc oxide or magnesium oxide in excess of that used for vulcanization may also advantageously serve as filling or reinforcing agents. In addition, softeners and antioxidants and compounding ingredients for other purposes may be present as desired.

Vulcanization of the compounded mixture of unvulcanized isoolefin-diolefin copolymer and unvulcanized neoprene is effected by heating in a press, with open steam, with hot air or in any other manner. The time and temperature required for vulcanization vary depending on the particular ingredients present in the composition but, in general, the application of a temperature of 250 to 330° F. for a time of 15 to 150 minutes depending on the temperature (the higher the temperature the shorter the time) is satisfactory.

As an example of the invention, a composition suitable for use in the manufacture of tire curing bags and inner tubes for heavy duty tires is prepared from the following ingredients:

| | Parts |
|---|---|
| GR-I (a plastic unvulcanized copolymer of isobutylene with a small proportion of isoprene) | 90.00 |
| GR-M (a plastic polymerized 2-chlorobutadiene-1,3) | 10.00 |
| Channel black | 40.00 |
| Stearic acid | 1.00 |
| Zinc oxide | 25.00 |
| Tetramethyl thiuram disulfide | 1.00 |
| 2-mercaptobenzothiazole | 0.50 |
| "Polyac" (a vulcanization activator consisting of an active agent which is a nitrogen- and oxygen-containing organic compound believed to possess a quinoid structure together with an inert carrier) | 0.50 |
| Sulfur | 2.00 |

This plastic unvulcanized composition is then heated at 292° F. for various periods of time whereupon it is transformed into a strong elastic vulcanizate having the tensile properties shown in the following table:

| Vulcanization at 292° F. Time of Cure | 300% Modulus | Tensile Strength, lbs./sq. in. | Elongation, Percent |
|---|---|---|---|
| 15' | 400 | 2,300 | 760 |
| 30' | 600 | 2,450 | 680 |
| 45' | 750 | 2,400 | 620 |
| 75' | 900 | 2,350 | 550 |
| 150' | 1,100 | 2,100 | 460 |

In the manufacture of tire curing bags from the above composition, the unvulcanized compound is formed into the shape of a tubular ring of a size suitable for inserting into a tire casing, with thin walls across the top and with walls gradually increasing in thickness toward the base, by extruding through an appropriate die, cutting the tubes to length and splicing the ends into a ring. A metal stem or valve is then inserted for admitting and removing fluid to and from the bag, and the assembly is vulcanized in a mold after which it is ready for use. In use, such a tire curing bag is inserted into an unvulcanized tire casing and the whole inserted into a mold in which the casing is vulcanized. During vulcanization a suitable fluid such as steam, hot water or air is forced into the curing bag to expand the bag and thus force the tire casing into the mold. After vulcanization of the casing, the curing bag is removed and reused repeatedly in the vulcanization of additional casings.

When a tire curing bag is made of the composition described above and used in the curing of tires, outstanding performance in service, far superior to that obtained with tire curing bags made of compositions in which the only rubbery material is isoolefin-diolefin copolymer rubber or neoprene, is secured. For example, in comparative performance tests it is found that a curing bag made of the above mixture of GR-M and GR-I withstands from 5 to 10 times as many tire curing operations before first failure as a similar curing bag made using GR-I alone, and withstands from 15 to 25 times as many such operations before first failure as a similar curing bag made using GR-M alone. The curing bag made of the isoolefin-diolefin copolymer neoprene mixture does not become soft and sticky on its inside surfaces due to prolonged exposure to the steam and hot water used for expanding the bag nearly so rapidly as does a similar bag made from isoolefin-diolefin copolymer alone; nor does it become hard and brittle on the outside surfaces as is often the case in the tire curing bags previously used. Rather it retains its elasticity so that it may properly perform its function for prolonged periods of time despite the high temperatures to which it is subjected in use.

In another example of the invention the following composition is prepared and vulcanized:

| | Parts |
|---|---|
| GR-I | 80.0 |
| GR-M | 20.0 |
| Medium processing channel black | 15.0 |
| Gastex carbon black | 35.0 |
| Zinc oxide | 5.0 |
| Stearic acid | 1.0 |
| Tetramethyl thiuram disulfide | 1.0 |
| 2-mercaptobenzothiazole | 0.5 |
| Polyac | 0.5 |
| Sulfur | 2.0 |

Inner tubes for heavy duty tires made of the above composition have been found to outlast similar inner tubes made of either isoolefin-diolefin copolymer rubber alone or neoprene alone. Such tubes are exposed to high temperatures in service and when made of rubbery materials heretofore used for this purpose, they either soften under the excessive heat, become thin due to flowing of the composition and eventually blow out, or else they become so brittle that cracking and failure occurs. When the tube is made of the isoolefin-diolefin copolymer neoprene mixture, however, it neither softens nor becomes brittle under the excessive heat until long after failure would ordinarily take place. Moreover, such a tube possesses outstanding resistance to diffusion of oxygen and other gases.

To illustrate further the invention and the advantages achieved thereby, a series of covulcanizates containing neoprene and isoolefin-diolefin copolymer in various proportions is prepared by blending various amounts of an isoolefin-diolefin copolymer rubber masterbatch and a neoprene masterbatch, the final blends and the masterbatches all being prepared by admixture on a roll mill.

The composition of the isoolefin-diolefin copolymer rubber masterbatch is as follows:

| | Parts |
|---|---|
| GR-I (copolymer of isobutylene with a small proportion of isoprene) | 100.0 |
| Zinc oxide | 5.0 |
| Stearic acid | 1.0 |
| Tetramethyl thiuram disulfide | 1.0 |
| 2-mercaptobenzothiazole | 0.5 |
| Sulfur | 2.0 |

The neoprene masterbatch is made up of the following ingredients:

| | Parts |
|---|---|
| Neoprene GN (a plastic polymer of 2-chlorobutadiene-1,3) | 100.0 |
| Magnesium oxide | 1.5 |
| Lead oleate | 7.5 |
| Channel black | 10.0 |
| Heptylated diphenyl amine | 1.0 |

Proportions of the two masterbatches are mixed so as to produce blends containing 10, 20, 30, 40, 50 and 80% of isoolefin-diolefin coplymer respectively based on the total amount of isoolefin-diolefin coplymer, and neoprene, and the blends so obtained are vulcanized for 60 minutes at 307° F. For purposes of comparison, vulcanizates of the butyl masterbatch alone and of the neoprene masterbatch alone are also prepared in the same manner. The ultimate elongation at room temperature and at 212° F. is then determined for each of the isoolefin-diolefin copolymer neoprene covulcanizates, for the vulcanizate of neoprene alone, and for the vulcanizate of isoolefin-diolefin copolymer alone. These values together with the percent of room temperature elongation retained at 212° F. are shown in the following table:

|  | Elongation at Room Temperature (R. T.), Per Cent | Elongation at 212° F., Per Cent | Per Cent of R. T. Elongation retained at 212° F. |
|---|---|---|---|
| Neoprene_____90%<br>Butyl_____10% | 800 | 420 | 52.5 |
| Neoprene_____80%<br>Butyl_____20% | 780 | 430 | 55.1 |
| Neoprene_____70%<br>Butyl_____30% | 770 | 560 | 72.7 |
| Neoprene_____60%<br>Butyl_____40% | 800 | 520 | 65.0 |
| Neoprene_____50%<br>Butyl_____50% | 750 | 500 | 66.6 |
| Neoprene_____20%<br>Butyl_____80% | 790 | 600 | 77.4 |
| All Neoprene | 790 | 210 | 26.6 |
| All Butyl | 780 | 200 | 25.6 |

It is apparent from the table that the convulcanizates of isoolefin-diolefin copolymer and neoprene all retain far more of their elongation at high temperature than does the all neoprene vulcanizate or the all isoolefin-diolefin copolymer vulcanizate, thus again illustrating the superiority in heat service of the convulcanizates of this invention.

The convulcanizates just described are examples of "high gum" covulcanizates since they contain small amounts of compounding ingredients. Such convulcanizates are extremely valuable in the manufacture of thread for winding golf balls and the like, since a material which retains a high percentage of its elongation at the high temperatures used in molding a cover on the wound golf ball is desirable for this application.

"High gum" and "pure gum" convulcanizates of neoprene and isoolefin-diolefin copolymer also are useful in many other applications. For example, such covulcanizates swell appreciably, but do not dissolve, in either aromatic hydrocarbons such as benzene or aliphatic hydrocarbons such as hexane and are therefore of great value as self-sealing elements in the manufacture of self-sealing fuel tanks, fuel hose and the like.

In addition to the compositions hereinabove specifically described, numerous other covulcanizates of isoolefin-diolefin copolymer and neoprene may be prepared, as will be obvious to those skilled in the art, and such covulcanizates may be utilized for the purposes hereinabove mentioned or in countless other applications. The unvulcanized mixtures prepared need not always be solid compositions, but may be prepared and applied in the form of solutions, cements, aqueous dispersions, etc., and then covulcanized, as will also be apparent to those skilled in the art. Accordingly it is not intended that the invention be limited by the specific embodiments set forth herein, but only by the spirit and scope of the appended claim.

We claim:

A tire curing bag comprising a hollow annular structure composed of a covulcanizate of (1) a plastic hydrocarbon copolymer of a major proportion of isobutylene with a minor proportion of isoprene and (2) a plastic polymer of 2-chlorobutadiene-1,3, in a proportion of about 90 parts of (1) with about 10 parts of (2), said tire curing bag being characterized by its ability to withstand from 5 to 25 times as many tire curing operations before failure as tire curing bags made with either (1) or (2) alone.

RICHARD A. CRAWFORD.
GAIL C. ROGERS.

REFERENCES CITED

The following references are of record in the file of this patent:

UNITED STATES PATENTS

| Number | Name | Date |
|---|---|---|
| 2,305,412 | Frolich et al. | Dec. 15, 1942 |
| 2,332,194 | Beekley et al. | Oct. 19, 1943 |
| 2,467,322 | Lightbown et al. | Apr. 12, 1949 |